(12) United States Patent
Kurita et al.

(10) Patent No.: US 11,853,103 B2
(45) Date of Patent: Dec. 26, 2023

(54) VEHICULAR DEVICE

(71) Applicant: DENSO CORPORATION, Kariya (JP)

(72) Inventors: Tetsuo Kurita, Kariya (JP); Hatsuho Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 17/456,289

(22) Filed: Nov. 23, 2021

(65) Prior Publication Data

US 2022/0083428 A1 Mar. 17, 2022

Related U.S. Application Data

(63) Continuation of application No. PCT/JP2020/018675, filed on May 8, 2020.

(30) Foreign Application Priority Data

May 28, 2019 (JP) ................................ 2019-099382

(51) Int. Cl.
| | |
|---|---|
| *G06F 11/00* | (2006.01) |
| *G06F 11/14* | (2006.01) |
| *G06F 1/28* | (2006.01) |
| *B60K 35/00* | (2006.01) |

(52) U.S. Cl.
CPC ............ *G06F 11/1451* (2013.01); *G06F 1/28* (2013.01); *B60K 35/00* (2013.01); *B60K 2370/164* (2019.05); *B60K 2370/166* (2019.05); *B60K 2370/167* (2019.05); *B60K 2370/178* (2019.05);

(Continued)

(58) Field of Classification Search
CPC ............ G06F 11/1451; G06F 11/1456; G06F 11/1441

See application file for complete search history.

(56) References Cited

U.S. PATENT DOCUMENTS

| | | | |
|---|---|---|---|
| 8,060,476 B1 * | 11/2011 | Afonso ............... | G06F 11/1464 707/823 |
| 9,977,704 B1 * | 5/2018 | Chopra ............... | G06F 11/0793 |
| 10,552,268 B1 * | 2/2020 | Xu ....................... | G06F 11/1466 |

(Continued)

FOREIGN PATENT DOCUMENTS

| | | |
|---|---|---|
| JP | 2001075741 A | 3/2001 |
| JP | 2003223287 A | 8/2003 |

(Continued)

*Primary Examiner* — Amine Riad
(74) *Attorney, Agent, or Firm* — Harness, Dickey & Pierce, P.L.C.

(57) ABSTRACT

A vehicular device includes a control unit, a non-volatile first storage unit, a second storage unit, a notification unit, and a backup unit. Multiple operating systems operate in the control unit. The backup unit is provided in each operating system and is configured to back up, on the first storage unit, data temporarily stored in the second storage unit. The backup unit is configured to back up the data on the first storage unit upon being notified of the change in the power supply state by the notification unit. The backup unit running on one operating system is configured to pass, to the backup unit provided in another operating system, target data or information identifying the target data. When a failure occurred in the one operating system, the backup unit provided in the other operating system backs up the target data or the information identifying the target data.

6 Claims, 5 Drawing Sheets

(52) U.S. Cl.
CPC ...... *B60K 2370/52* (2019.05); *G06F 2201/82* (2013.01)

(56) References Cited

U.S. PATENT DOCUMENTS

| | | | |
|---|---|---|---|
| 11,526,410 B2* | 12/2022 | Mitkar | G06F 3/065 |
| 2003/0097533 A1* | 5/2003 | Maeda | G06F 11/1456 714/E11.122 |
| 2005/0132157 A1 | 6/2005 | Maeda et al. | |
| 2008/0154985 A1* | 6/2008 | Childs | G06F 3/0661 |
| 2010/0049929 A1* | 2/2010 | Nagarkar | G06F 11/1415 718/1 |
| 2014/0149695 A1* | 5/2014 | Zaslavsky | G06F 9/455 711/162 |
| 2014/0181046 A1* | 6/2014 | Pawar | G06F 16/27 707/654 |
| 2015/0242283 A1* | 8/2015 | Simoncelli | G06F 11/1456 711/162 |
| 2016/0019085 A1* | 1/2016 | Khandekar | G06F 9/45558 718/1 |
| 2016/0048400 A1* | 2/2016 | Yang | H04L 67/10 718/1 |
| 2016/0328254 A1 | 11/2016 | Ahmed et al. | |
| 2018/0018109 A1* | 1/2018 | Mueller | G06F 3/065 |
| 2020/0148144 A1 | 5/2020 | Shiomi | |
| 2022/0035957 A1* | 2/2022 | O'Brien, III | G06F 11/1441 |

FOREIGN PATENT DOCUMENTS

| | | |
|---|---|---|
| JP | 2008269094 A | 11/2008 |
| JP | 2015132979 A | 7/2015 |
| JP | 2017507401 A | 3/2017 |
| JP | 2019018844 A | 2/2019 |
| WO | WO-2013140570 A1 | 9/2013 |

* cited by examiner

VEHICULAR DEVICE

CROSS REFERENCE TO RELATED APPLICATION

The present application is a continuation application of International Patent Application No. PCT/JP2020/018675 filed on May 8, 2020, which designated the U.S. and claims the benefit of priority from Japanese Patent Application No. 2019-099382 filed on May 28, 2019. The entire disclosures of all of the above applications are incorporated herein by reference.

TECHNICAL FIELD

The present disclosure relates to a vehicular device.

BACKGROUND

In recent years, there is a vehicular device in which a display is disposed near the meter panel to display information about the vehicle such as speed, or the entire meter panel is composed of a display to graphically display a speedometer or the like. There is also a vehicular device provided with a display for displaying so-called multimedia information such as a navigation screen. Further, there is disclosed a vehicular device that integrates multiple functions such as displaying vehicle related information and displaying the multimedia information. Hereinafter, a vehicular device integrating multiple functions will be referred to as an integrated vehicular device for convenience.

SUMMARY

A vehicular device according to a first aspect includes a control unit, a non-volatile first storage unit, a second storage unit, a notification unit, and a backup unit. Multiple operating systems operate in the control unit. The non-volatile first storage unit has a limited number of rewrite. The second storage unit has no limitation on a number of rewrite. The notification unit is configured to notify of a change in a power supply state of the vehicular device. The backup unit is provided in each operating system and is configured to back up, on the first storage unit, data temporarily stored in the second storage unit. The backup unit is configured to back up the data on the first storage unit upon being notified of the change in the power supply state by the notification unit. The backup unit running on one operating system is configured to pass, to the backup unit provided in another operating system, target data of the one operating system or information identifying the target data of the one operating system, the target data being a target of the backup. When the target data of the one operating system or the information identifying the target data of the one operating system was passed to the other operating system and a failure occurred in the one operating system, the backup unit provided in the other operating system backs up the target data of the one operating system or the information identifying the target data of the one operating system.

A vehicular device according to a second aspect includes a control unit, a non-volatile first storage unit, a second storage unit, a notification unit, and a backup unit. Multiple operating systems operate. The non-volatile first storage unit has a limited number of rewrite. The second storage unit has no limitation on a number of rewrite. The notification unit is configured to notify of a change in a power supply state of the vehicular device. The backup unit is provided in each operating system and is configured to back up, on the first storage unit, data temporarily stored in the second storage unit. The backup unit is configured to back up the data on the first storage unit upon being notified of the change in the power supply state by the notification unit. The plurality of operating systems include a first operating system, and a second operating system that is less stable than the first operating system. The backup unit provided in the first operating system is configured to monitor a failure in the second operating system. When the failure occurred in the second operating system, back up the data of the second operating system or information identifying the data of the second operating system.

A vehicular device according to at least one processor, a non-volatile first memory, and a second memory. Multiple operating systems operate in the at least one processor. The non-volatile first memory has a limited number of rewrite. The second memory has no limitation on a number of rewrite and temporarily stores data of each operating system. The at least one processor is configured to back up, on the first memory, the data temporarily stored in the second memory in response to a change in a power supply state of the vehicular device. The at least one processor is configured to pass target data, which is a target of the backup, of one operating system or information identifying the target data of the one operating system to another operating system. When the target data of the one operating system or the information identifying the target data of the one operating system was passed to the other operating system and a failure occurred in the one operating system, back up the passed target data or the passed information identifying the target data.

EMBODIMENTS

Lots of data is used in the integrated vehicular device. Each data is saved in a non-volatile storage unit for booting at high-speed or being used for the next time. Although eMMC or the like is used as the non-volatile storage unit, such storage unit has limited number of rewrites. Generally, the data is temporarily stored in another storage unit having no limitation on the number of rewrites such as the main memory, and the stored data is backed up in the non-volatile storage unit when the power is turned off.

However, in the integrated vehicular device, multiple operating systems and multiple application programs running on the operating systems operate for providing multiple functions. Hereinafter, the operating system is referred to as OS, and the application program is referred to as the application. If the data is backed up independently in each OS, it may be difficult to ensure consistency of the data.

Figure 1:
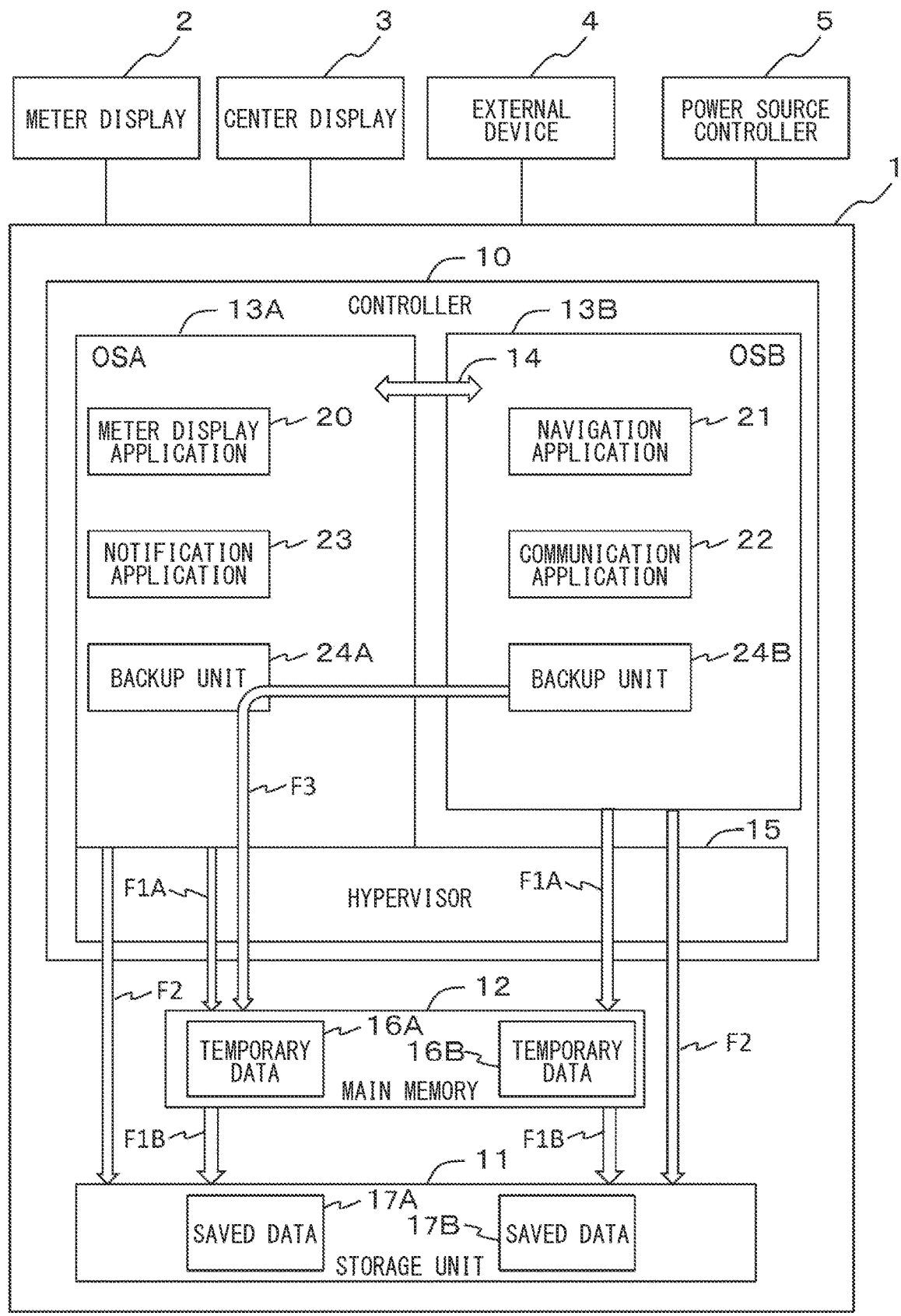
FIG. 1 is a diagram schematically showing a vehicular device according to an embodiment.

Hereinafter, an embodiment will be described. As shown in FIG. 1, a vehicular device 1 is coupled with displays such as a meter display 2 and a center display 3, an external device 4 such as a portable terminal carried by a user, a power source controller 5 configured to control power supply to the vehicular device 1, and the like. The vehicular device 1 is a so-called vehicle infotainment device configured to present information of a vehicle and multimedia information as described later. The configurations shown in FIG. 1 is just an example and the present disclosure is not limited to the configurations shown in FIG. 1.

The meter display 2 is provided by, for example, a liquid crystal display or an organic EL display, and is disposed on a meter panel located on a front side of a driver. The meter display 2 mainly displays, for example, vehicle speed, warning, information stipulated by law, information indicating a state of the vehicle such as the remaining amount of fuel and whether or not the seatbelt is fastened, and information indicating traveling state or safety of the vehicle in full graphic. Hereinafter, these information will be referred to as vehicle information for convenience. The meter display 2 may be located in the central portion of the meter panel, and the speedometer, the tachometer, warning lights, and the like may be of the so-called analog type.

The center display 3 is provided by, for example, a liquid crystal display or an organic EL display, and is arranged to be adjacent to a so-called center console. The center display 3 displays, for example, a navigation screen image and a menu screen image. The center display 3 can also display a television broadcast, information about a music being played back or the like.

The meter display 2 and the center display 3 can display information by being seamlessly linked with one another. Accordingly, the navigation screen can be displayed on the meter display 2, and the vehicle speed can be displayed on the center display 3, for example.

That is, in the vehicular device 1, multiple functional units including a functional unit that displays the vehicle information and a functional unit that displays multimedia information are integrated to provide various information. The vehicular device 1 is an integrated type device that can present information visually or audibly to the driver.

The vehicular device 1 is controlled by one controller 10. The controller 10 is composed of a so-called microprocessor having a CPU (not shown). The controller 10 is configured to control the vehicular device 1 by executing computer programs stored in a flash memory 11. At this time, each program is read and executed on a main memory 12.

The flash memory 11 is composed of non-volatile semiconductor elements such as eMMC and stores data used by various functional units of the controller 10 in addition to the computer programs. The flash memory 11 has a limited number of rewrites. The flash memory 11 corresponds to a first storage unit.

In contrast, the main memory 12 is composed of semiconductor elements such as DRAM. The main memory 12 is a volatile memory whose data is lost when the power is turned off, although the number of rewrites is not limited. The main memory 12 corresponds to a second storage unit.

Accordingly, in the vehicular device 1, the data used by the controller 10 is temporarily stored in the main memory 12 during the normal operation, and its backup is saved in the flash memory 11 at the timing when the vehicular device 1 is turned off. As a result, the number of rewrites to the flash memory 11 is reduced.

A virtual environment in which multiple operating systems 13 can operate is provided by the controller 10. Hereinafter, the operating system 13 will be referred to as an OS 13. In the present embodiment, OS 13A and OS 13B operate in the controller 10. That is, in the vehicular device 1, multiple systems operate on one hardware to share many processes of the integrated vehicular device 1.

The OS 13A and the OS 13B are connected through data path 14 to communicate with each other. The OS 13A and the OS 13B share the flash memory 11, the main memory 12, and devices such as a display circuit and a communication circuit (not shown) included in the vehicular device 1.

Each OS 13 runs on a hypervisor 15. In the present embodiment, the hypervisor 15 is provided as a function of the OS 13A. The hypervisor 15 may be provided separately to run the OS 13A and the OS 13B on the hypervisor 15.

The OS 13A is a so-called real-time OS, and includes a functional block that mainly executes a process that requires real-time performance such as a process related to vehicle running or safety, as compared with the OS 13B. In general, such a real-time OS is less likely to cause a problem in the OS 13A itself, and can be considered to have relatively higher stability than a general-purpose OS because it can predict or limit the execution time of an application program. The OS 13A corresponds to a first operating system. Hereinafter, an application program will also be referred to as an application.

The OS 13B is a so-called general-purpose OS. Although its real-time performance and stability are relatively low as compared with the OS 13A, it has an advantage that general-purpose processing such as a so-called multimedia function can be easily executed. The OS 13B corresponds to a second operating system.

Each OS 13 provides various functional units in software manner by executing various applications. The controller 10 includes, as functional units, a meter display application 20, a navigation application 21, a communication application 22, a notification application 23, and a backup unit 24. The number and type of functional units shown in FIG. 1 or the OS 13 on which the functional units are implemented are shown as exemplary configurations, and the present disclosure is not limited to the configuration shown in FIG. 1.

Each OS 13 is configured to store data used by the OS 13 itself or the applications running on the OS 13 in the main memory 12 as temporary data 16 as indicated by arrows F1A. The temporary data 16 will be collectively saved in the flash memory 11 as saved data 17 as indicated by arrows F1B. The details will be described later. Hereinafter, the process to collectively back up, in the flash memory 11, the data temporarily stored in the main memory 12 is also referred to as a batch processing.

Further, each OS 13 may save the data in the flash memory 11 as the saved data 17 as indicated by arrows F2 without storing it in the main memory 12. Hereinafter, the process to directly back up the data in the flash memory 11 is also referred to as a sequential processing.

The data to be batch processed may include, for example, data used by the navigation application 21 such as matching information, location information, and driving track information, playback position data of musics, diagnosis code data for failure diagnosis, and memory dump data of the OS 13. Since these data are updated more frequently than once a second, for example, it is not recommended to write them to the flash memory 11 every time they are updated.

The data to be sequentially processed may include, for example, the time when the vehicular device was booted and the channel of the radio broadcast being received. Since these data are updated infrequently, it is thought that there is little problem even if they are written to the flash memory 11 each time they are updated.

The meter display application 20 is provided as a functional unit configured to display mainly on the meter display 2. The meter display application 20 displays information necessary for traveling of the vehicle like the speedometer. The information display controlled by the meter display application 20 is updated at a relatively short cycle of, for example, about 1/60 second. Therefore, the meter display application 20 is included in the OS 13A. The images displayed by the meter display application 20 are transmitted to the meter display 2 as image data in LVDS format, for example.

The navigation application 21 is provided as a functional unit configured to display mainly on the center display 3. The navigation application 21 executes multimedia process such as generation and display of the navigation screen, and audio output for route guidance. Therefore, the navigation application 21 is provided in the OS 13B. The images displayed by the navigation application 21 are transmitted to the center display 3 as image data in LVDS format, for example.

The communication application 22 is provided as a functional unit configured to communicate with the external device 4 connected with the vehicular device 1. The communication application 22 may communicate with the external device 4 using known communication methods such as USB, Bluetooth (registered trademark), Wi-Fi, and the like. The external device 4 may include a tablet, a USB memory, a server on the Internet, or the like, in addition to the above-described portable terminal.

The notification application 23 is configured to notify the backup unit 24 of changes of a power supply state of the vehicular device 1. Specifically, the vehicular device 1 is provided with a low-voltage power supply circuit that can handle voltage drops due to cranking at engine startup, and the power is supplied from the power supply circuit to the controller 10, the storage unit 11, and the main memory 12. The notification application 23 is configured to notify the change of the power supply state in the low-voltage power supply circuit. At this time, the notification application 23 acquires the power supply state from the power source controller 5 controlling the power supply of the vehicular device 1, and notifies the backup unit 24 of the acquired power supply state. The power source controller 5 is configured to acquire the change of the power supply voltage and notify the notification application 23 of the acquired result. As a result, the notification application 23 can acquire the change of the power supply state.

The power source controller 5 is configured to receive signals indicating the state of the vehicle from an ECU (not shown). Accordingly, the change of the power supply state may be notified to the backup unit 24 when the controller 10 receives a stop signal that is transmitted from another ECU and indicates a state where the vehicular device 1 can be turned off.

In this case, the notification application 23 is configured to determine that the power supply state has changed upon receiving, through the power source controller 5, the signal indicating the state where the vehicular device 1 can be turned off. In the present embodiment, the notification application 23 is provided on the OS 13A having higher stability. That is, in the vehicular device 1, the OS 13A serves as a master to control the timing when the backup is made in the OS 13B. The notification application 23 corresponds to a notification unit.

The backup unit 24 is a functional unit configured to back up the data used by the controller 10 in the flash memory 11 upon being notified of the change of the power supply state by the notification application 23. In the present embodiment, the backup unit 24 backs up, in the flash memory 11, the temporary data 16 stored in the main memory 12. Although the backup unit 24 in FIG. 1 is provided separately, the functions of the backup unit 24 may be added to each application. The backup unit 24 is provided as so-called middleware.

The backup unit 24 running on one OS 13 passes, to the backup unit 24 running on another OS 13, the data in the one OS 13 to be backed up or information identifying the data to be backed up. When the backup unit 24 received the data or the information identifying the data, and a failure occurred in the one OS 13, the backup unit 24 backs up in the flash memory 11 the data in the one OS 13 or the information identifying the data in the one OS 13 in which the failure occurred.

When the failure in the one OS 13 was fixed, the backup unit 24 passes, to the one OS 13 whose failure was fixed, the backup data or the information identifying the data which was backed up in the flash memory 11. When the backup unit 24 makes the backup in the flash memory 11, the backup unit 24 stops the rewriting of the data by the other functional units.

At this time, each OS 13 uses its own data or the data having a dependency between the OS 13. Therefore, the backup unit 24 is provided in each OS 13. The data having a dependency between the OS 13 may include the data required for seamlessly linking the meter display 2 and the center display 3, for example.

Next, the operation of the vehicular device 1 having the above configuration will be described.

As described above, in the integrated vehicular device 1, the functional units are independently operating on multiple OS 13. Since each OS 13 uses its own required data, each OS 13 has its own backup unit 24. Hereinafter, the backup unit 24 provided on the OS 13A is referred to as the backup unit 24A, and the backup unit 24 provided on the OS 13B is referred to as the backup unit 24B.

If each OS 13 makes backup independently, there may be possibilities of inconsistency when the data with dependencies between the OS 13 is backed up. In view of this point, the vehicular device 1 takes the following steps to ensure the consistency of the backup data in an environment where multiple OS 13 are operating.

In the vehicular device 1, each OS and each application use the data in the normal operation. At this time, some of the data is saved in the flash memory 11 as the saved data 17 to use it when the vehicular device 1 is turned on next time.

Figure 2:
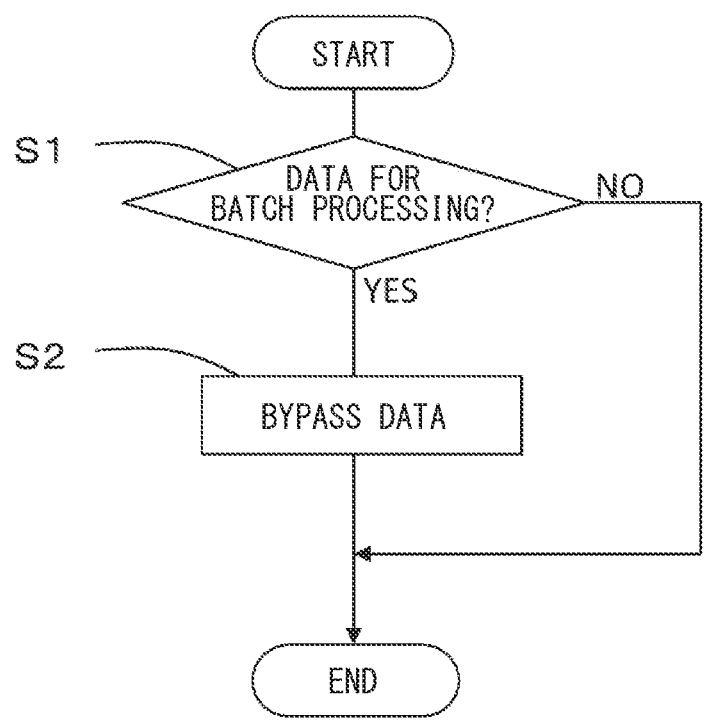
FIG. 2 is a flowchart illustrating a normal process executed by an OS B.

The backup unit 24B executes the process shown in FIG. 2. In step S1, the backup unit 24B determines whether the data to be saved is the data to be batch processed. At this time, the OS 13B and each application may pass the data to the backup unit 24B. Alternatively, the OS 13B and each application may have the function of the backup unit 24B such that the OS 13B and each application make the determination by themselves. In the following, for simplicity of explanation, the backup unit 24B is the subject in any of the above configurations.

When the backup unit 24B determines that the data is the target of the batch processing (step S1: YES), the backup unit 24B bypasses the data as indicated by an arrow F3. The bypass is the process to pass the data to be stored in the main memory 12 to the backup unit 24A. That is, in the normal operation, the backup unit 24B on the OS 13B passes the data to be batch processed to the OS 13A. When the backup unit 24B determines that the data is not the target of the batch processing (step S1: NO), the backup unit 24B waits for next data.

Figure 3:
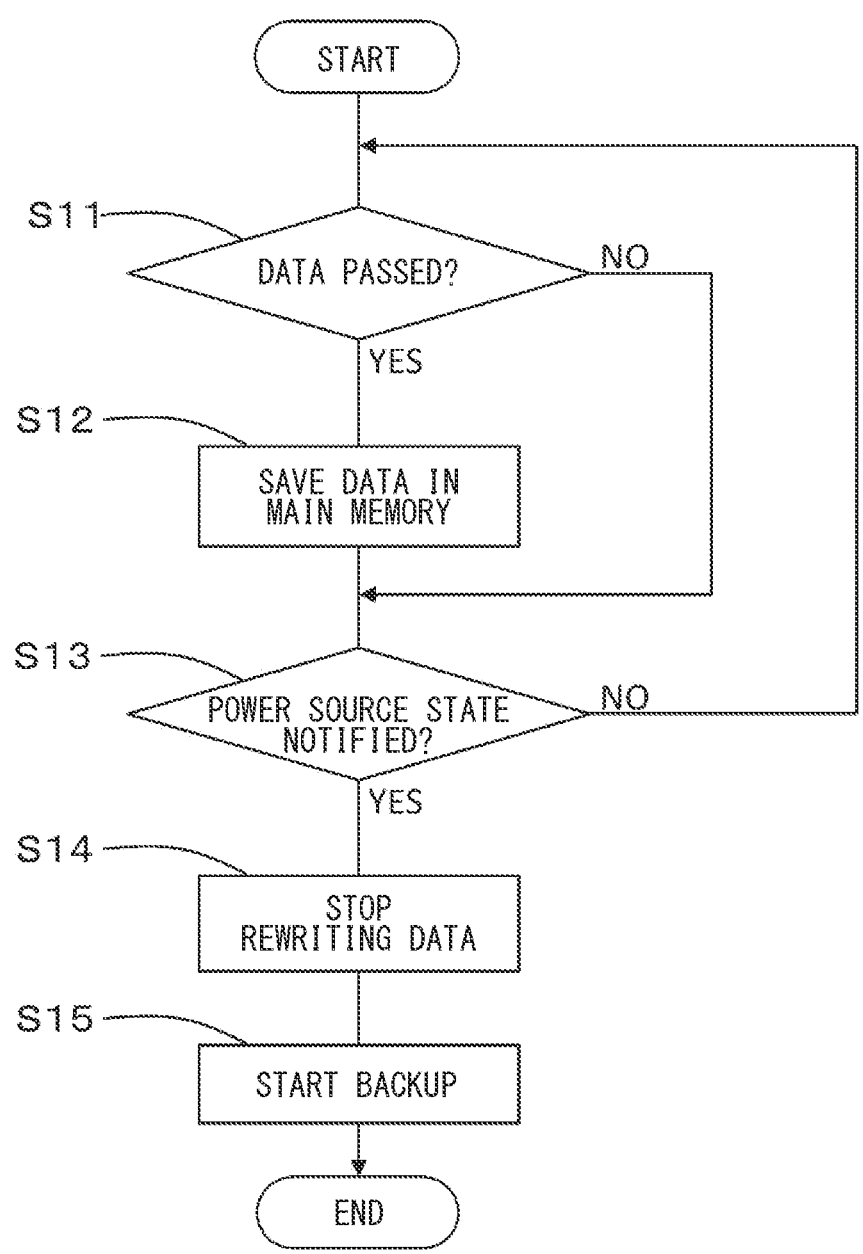
FIG. 3 is a flowchart illustrating a normal process executed by an OS A.

The backup unit 24A on the OS 13A executes the process shown in FIG. 3, and determines whether the data was passed from the OS 13B in step S11. That is, the backup unit 24A determines whether the data was bypassed. When the backup unit 24A determines that the data was not passed (step S11: NO), the process proceeds to step S13 and the backup unit 24A determines whether the power supply state was notified. When the backup unit 24A determines that the power supply state was not notified (step S13: NO), the backup unit 24A repeats the determinations in steps S11 and S13.

In contrast, when the backup unit 24A determines that the data was passed (step S11: YES), the backup unit 24A stores the passed data as the temporary data 16B in a predetermined space of the main memory 12 in step S12. The data in the OS 13A is temporarily stored in the main memory 12 or is saved in the flash memory 11 through the backup unit 24A or by the function of the backup unit 24A included in the OS 13A or each application.

When the backup unit 24A was notified of the power supply state (step S13: YES), the backup unit 24A stops the rewriting by the other functional units in step S14. This prevents data from being updated during the backup process, which would result in inconsistencies.

Subsequently, the backup unit 24A starts making backup in step S15. At this time, the backup unit 24A saves the temporary data 16A and 16B, which are stored in the main memory 12, in the flash memory 11 as the saved data 17A and 17B. That is, the backup unit 24A is responsible for making backup of the data in the OS 13B to be batch processed.

As a result, the data that is the target of the batch processing in the OS 13A and the OS 13B can be backed up upon being notified of the power supply state, and inconsistency of the data can be limited. After that, the backup unit 24A ends the process. Since the power supply state is notified to turn the vehicular device 1 off in the present embodiment, the vehicular device 1 itself starts an end sequence when the backup is completed, and then the vehicular device 1 is turned off.

As described above, the vehicular device 1 is configured to maintain consistency of the data at the end of the normal operation.

Figure 4:
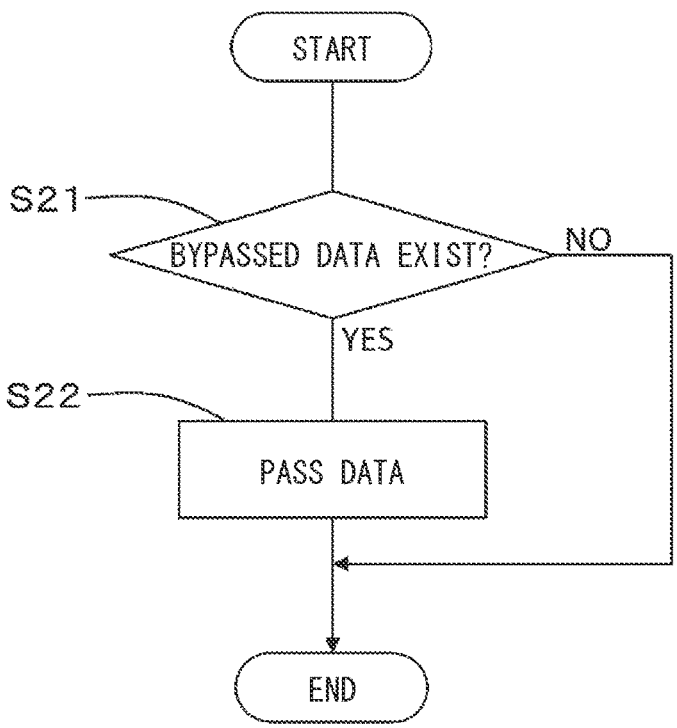
FIG. 4 is a flowchart illustrating a process executed at startup by the OS A.

When the backup unit 24A makes backup of the data, it is necessary to pass the data at the next startup. Accordingly, the backup unit 24A executes the process shown in FIG. 4 at startup, and determines in step S21 whether the bypassed data exists. That is, the backup unit 24A determines whether the data for which the backup unit 24A made backup on behalf of another unit exists.

When the backup unit 24A determines that the data for which the backup unit 24A made backup on behalf of another unit exists (step S21: YES), the backup unit 24A passes the data to the OS 13B in step S22. When the backup unit 24A determines that the data for which the backup unit 24A made backup on behalf of another unit does not exist (step S21: NO), the process ends.

Figure 5:
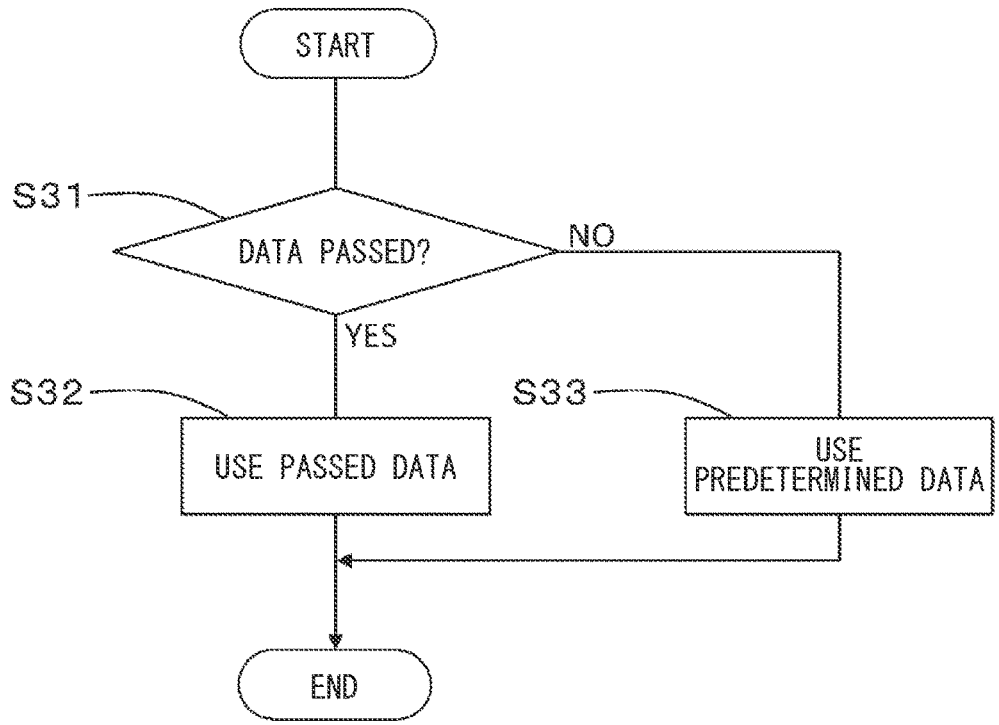
FIG. 5 is a flowchart illustrating a process executed at startup by the OS B.

The backup unit 24B executes the process shown in FIG. 5 at startup, and determines whether data is to be passed. When the backup unit 24B determines that data is to be passed (step S31: YES), the backup unit 24B uses the passed data. As a result, the OS 13B operates using the previous data.

In contrast, when the backup unit 24B determines that data is not to be passed (step S31: NO), the backup unit 24B uses a predetermined data such as initial values in step S33, for example. As a result, the OS 13B operates based on the data of the initial values.

The normal operation has been described above. However, the vehicular device 1 has a point to be cared other than ensuring data consistency. It is the proper retainment of data. The vehicular device 1 is the integrated device in which the OS 13A and the OS 13B operate, and has a complicated system configuration. Since the OS 13B is less stable than the OS 13A and is connected with the external device 4, there may be higher possibilities to occur a failure in the OS 13B.

When a failure occurs in the OS 13B, it is necessary to solve the failure by resetting the OS 13B, for example. The failure may include a reset by state monitoring and a reset by user operation. In such cases, only the OS 13B is restarted while the operation of the OS 13A is continued. As it is, the OS 13B would operate based on the data stored in past not in the same state as before the restart, and it may be difficult to return to the same state as before the restart.

Figure 6:
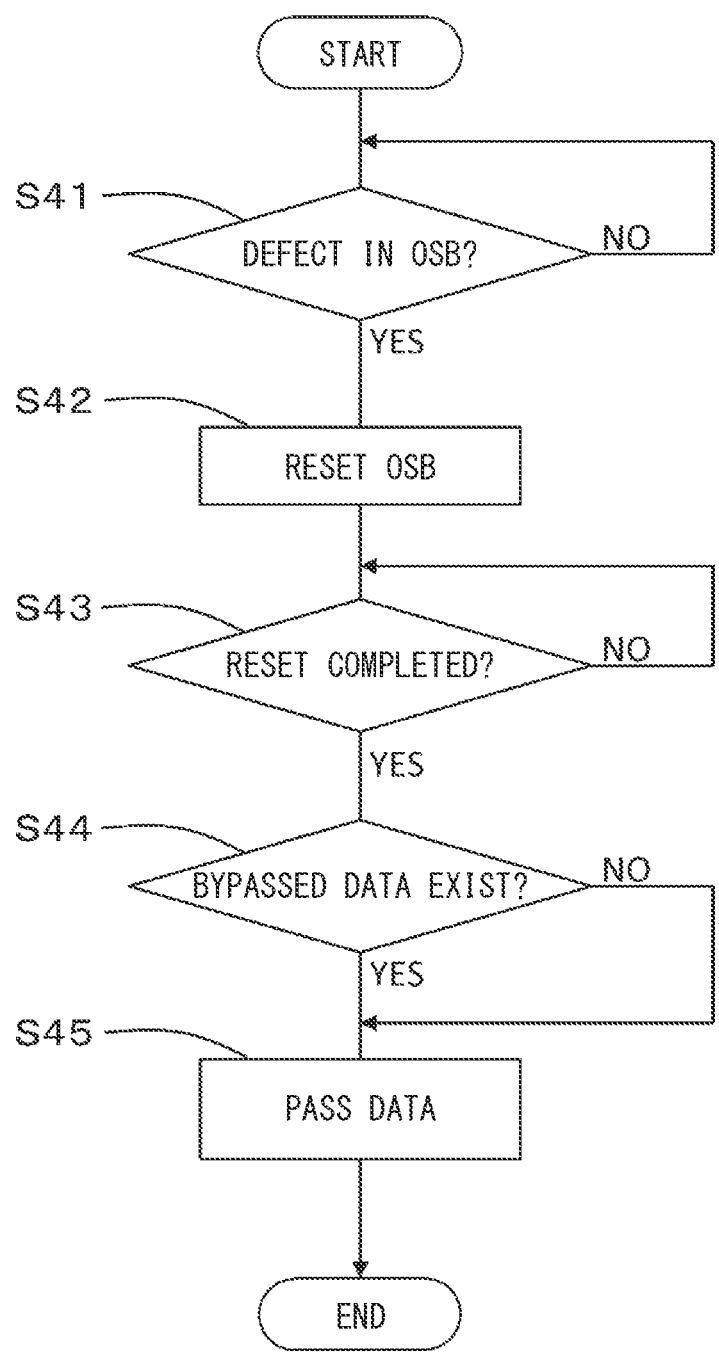
FIG. 6 is a flowchart illustrating a process to cope with failures by the OS A.

In view of this point, the backup unit 24A is configured to execute the process shown in FIG. 6. The backup unit 24A monitors a failure in OS 13B in step S41. When the backup unit 24A determines that a failure has not occur in the OS 13B (step S41: NO), the backup unit 24A stands by. In contrast, when the backup unit 24A determines that a failure occurred in the OS 13B (step S41: YES), the backup unit 24A resets the OS 13B.

Subsequently, the backup unit 24A determines in step S43 whether the reset of the OS 13B has completed. When the reset of the OS 13B has not completed (step S43: NO), the backup unit 24A waits for the completion of the reset.

In contrast, when the backup unit 24A determines that the reset of the OS 13B has completed (step S43: YES), the backup unit 24A further determines in step S44 whether the bypassed data exists. When the backup unit 24A determines that the bypassed data exists (step S44: YES), the backup unit 24A passes the bypassed data to the OS 13B.

As a result, even when the OS 13B is reset due to the failure, the OS 13B operates using the bypassed data, which was used immediately before the reset, after the reset. That is, the data can be retained before and after the reset. In this way, the backup unit 24 in each OS 13 is configured to back up the data upon being notified of the change of the power supply state.

According to the embodiment described above, following advantages can be achieved. The vehicular device 1 includes: the controller 10 in which multiple OS 13 operate; the flash memory 11 as the non-volatile first storage unit that stores the data used by the controller 10 and has a limited number of rewrites; and the main memory 12 as the second storage unit that temporarily stores the data used by the controller 10 and has no limitation on the number of rewrites. The vehicular device 1 further includes: the backup unit 24 provided in each of multiple OS 13 and configured to back up the data used by the controller 10 on the flash memory 11; and the notification application as the notification unit configured to notify the change of the power supply state.

The backup unit 24 is configured to make backup of the data on the flash memory 11 upon being notified of the change of the power supply state by the notification application 23. Accordingly, the backup timing in each OS 13 that operates independently can be synchronized. Accordingly, even when the data having a dependency between the OS 13 is backed up, the data can be made consistent.

In the vehicular device 1, the backup unit 24 running on one OS 13 is configured to pass the data, which is the backup target data of the one OS 13, to the backup unit 24 in another OS 13. When the data was passed from the one OS 13 to the other OS 13 and the failure occurred in the one OS 13, the backup unit 24 in the other OS 13 backs up the data of the one OS 13 on the flash memory 11. According to this, the data can be retained and made consistent even when the failure occurs in the OS 13.

In the vehicular device 1, when the failure in the one OS 13 is fixed, the backup unit 24 passes, to the one OS 13, the backup data whose backup has been made on the flash memory 11. According to this, the data can be saved to ensure consistency of the data before and after the failure occurred, and the same data can be used.

In the vehicular device 1, the OS 13 includes a first OS 13 having relatively high stability and a second OS 13A having relatively low stability compared with the first OS 13B. The backup unit 24 provided in the first OS 13A is configured to: monitor the failure in the second OS 13B; and back up the data of the second OS 13B in response to the failure occurring in the second OS 13B. According to this, the data of the OS 13B, in which the failure may relatively likely to occur, can be retained and made consistent.

In the vehicular device 1, when the backup unit 24 makes the backup on the flash memory 11, the backup unit 24 stops the rewriting of the data by the other functional units. This prevents data from being updated during the backup process, which would result in inconsistencies.

In the embodiment, the data itself is passed to another OS 13. However, the backup unit 24 may pass, instead of the data itself, information identifying the data such as address of the temporary data in the main memory 12, for example. According to such configurations also, the backup can be performed in response to the failure occurred.

The backup unit 24 is configured to selectively pick up the data to be a target of the backup from the data or assign priority to the data, and pass the data to the backup unit 24 provided in another OS 13. According to this, the load for the backup and the bypass can be reduced.

In the embodiment, the data is passed to another OS 13. However, the backup unit 24 of each OS 13 may execute the batch processing upon being notified of the power supply state without passing the data. According to this configuration also, the timing of the batch processing can be synchronized to ensure the consistency of the data.

In the embodiment, the data of the OS 13B is passed to the OS 13A, and the backup unit 24A in the OS 13A backs up the passed data when the failure occurred in the OS 13B. However, the data of the OS 13A may be passed to the OS 13B, and the backup unit 24B in the OS 13B may back up the passed data when the failure occurred in the OS 13A.

In the embodiment, the backup unit 24 or the OS 13B and each application having the functions of the backup unit 24 determines whether the data is the target of the batch processing. However, the OS 13B and each application may be configured to store the data in the main memory 12, and they may be configured to: notify the backup unit 24 provided separately that the stored data is the target of the batch processing; and notify the backup unit 24 of the information identifying the data such as the address in the main memory 12.

In the embodiment, the notification application 23 is provided in the OS 13A. However, the notification application 23 may be provided in each OS 13. The notification application 23 may be provided in the hypervisor 15.

Although the present disclosure has been described in accordance with the embodiment, it is understood that the present disclosure is not limited to the embodiment and the structure. The present disclosure encompasses various modifications and variations within the scope of equivalents. In addition, various combinations and forms, and further, other combinations and forms including only one element, or more or less than these elements are also within the spirit and the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer readable program may be stored, as instructions to be executed by a computer, in the memory which is a tangible non-transitory computer-readable medium. The memory may be provided by a semiconductor memory device or a programmable circuit.

What is claimed is:

1. A vehicular device comprising:
   a control unit in which a plurality of operating systems operate;
   a non-volatile first storage unit that has a limited number of rewrite;
   a second storage unit that has no limitation on a number of rewrite;
   a notification unit configured to notify of a change in a power supply state of the vehicular device; and
   a backup unit provided in each of the plurality of operating systems and configured to back up, on the first storage unit, data temporarily stored in the second storage unit, wherein
   the backup unit is configured to back up the data on the first storage unit upon being notified of the change in the power supply state by the notification unit,
   the backup unit running on one operating system of the plurality of operating systems is configured to pass, to the backup unit provided in another operating system of the plurality of operating systems, target data of the one operating system or information identifying the target data of the one operating system, the target data being a target of the backup, and
   when the target data of the one operating system or the information identifying the target data of the one operating system was passed to the other operating system and a failure occurred in the one operating system, the backup unit provided in the other operating system backs up the target data of the one operating system or the information identifying the target data of the one operating system.

2. A vehicular device comprising:
   a control unit in which a plurality of operating systems operate;
   a non-volatile first storage unit that has a limited number of rewrite;

a second storage unit that has no limitation on a number of rewrite;

a notification unit configured to notify of a change in a power supply state of the vehicular device; and a backup unit provided in each of the plurality of operating systems and configured to back up, on the first storage unit, data temporarily stored in the second storage unit, wherein the backup unit is configured to back up the data on the first storage unit upon being notified of the change in the power supply state by the notification unit, the plurality of operating systems include
- a first operating system, and
- a second operating system that is less stable than the first operating system, and the backup unit provided in the first operating system is configured to
- monitor a failure in the second operating system, and
- when the failure occurred in the second operating system, back up the data of the second operating system or information identifying the data of the second operating system.

3. The vehicular device according to claim 1, wherein when the failure that occurred in the one operating system was fixed, the backup unit provided in the other operating system passes, to the one operating system, the backed up target data of the one operating system or the backed up information identifying the target data of the one operating system.

4. The vehicular device according to claim 1, wherein the backup unit provided in the one operating system is configured to
- selectively pick up the target data from the data of the one operating system or assign priority to the target data, and
- pass the target data to the backup unit provided in the other operating system.

5. The vehicular device according to claim 1, wherein the backup unit is configured to stop a rewrite of the data by another functional unit while the backup unit backs up the data.

6. A vehicular device comprising:

at least one processor in which a plurality of operating systems operate;

a non-volatile first memory that has a limited number of rewrite; and a second memory that has no limitation on a number of rewrite and temporarily stores data of each of the plurality of operating systems, wherein the at least one processor is configured to
- back up, on the first memory, the data temporarily stored in the second memory in response to a change in a power supply state of the vehicular device,
- pass target data, which is a target of the backup, of one operating system of the plurality of operating systems or information identifying the target data of the one operating system to another operating system of the plurality of operating systems,
- when the target data of the one operating system or the information identifying the target data of the one operating system was passed to the other operating system and a failure occurred in the one operating system, back up the passed target data or the passed information identifying the target data.

* * * * *